United States Patent
Lu (10) Patent No.: US 8,237,859 B2
(45) Date of Patent: Aug. 7, 2012

(54) METHOD FOR VIDEO CONVERSION OF VIDEO STREAM AND APPARATUS THEREOF

(75) Inventor: Yi-Pin Lu, Tainan County (TW)

(73) Assignee: Himax Technologies Limited, Fonghua Village, Xinshi Dist., Tainan (TW)

( * ) Notice: Subject to any disclaimer, the term of this patent is extended or adjusted under 35 U.S.C. 154(b) by 1195 days.

(21) Appl. No.: 11/855,160

(22) Filed: Sep. 14, 2007

(65) Prior Publication Data

US 2009/0073312 A1  Mar. 19, 2009

(51) Int. Cl.
*H04N 7/01* (2006.01)
(52) U.S. Cl. .......... 348/451; 348/452; 382/300
(58) Field of Classification Search .......... 348/451, 348/452, 699, 700, 701; 382/300
See application file for complete search history.

(56) References Cited

U.S. PATENT DOCUMENTS

| 6,549,240 | B1 | 4/2003 | Reitmeier | |
| 6,930,728 | B2 * | 8/2005 | Rhee | 348/448 |
| 6,975,359 | B2 * | 12/2005 | Jiang | 348/348 |
| 7,295,245 | B2 * | 11/2007 | Ha | 348/452 |
| 7,375,763 | B2 * | 5/2008 | Alfonso et al. | 348/448 |
| 7,843,509 | B2 * | 11/2010 | Hahn et al. | 348/448 |
| 2004/0071313 | A1 * | 4/2004 | Hahn et al. | 382/100 |
| 2005/0285815 | A1 | 12/2005 | Tryhub | |
| 2006/0092321 | A1 | 5/2006 | Ogino | |

FOREIGN PATENT DOCUMENTS

TW  540241  7/2003

* cited by examiner

*Primary Examiner* — Annan Shang
(74) *Attorney, Agent, or Firm* — Winston Hsu; Scott Margo (57) ABSTRACT

A method for video conversion of a video stream includes: interpolating a first interpolated frame according a first frame and a second frame of the video stream; and interpolating a second interpolated frame according to the first frame and the first interpolated frame. In addition, the method further includes interpolating a third interpolated frame according to the second frame and the first interpolated frame.

8 Claims, 8 Drawing Sheets

METHOD FOR VIDEO CONVERSION OF VIDEO STREAM AND APPARATUS THEREOF

BACKGROUND OF THE INVENTION

1. Field of the Invention

The present invention relates to processing video stream, and more particularly, to a method for video conversion of a video stream and apparatus thereof.

2. Description of the Prior Art

In current video products, the LCD (liquid crystal display) monitor is a popular media product, but when video streams with low frame rates are displayed on an LCD monitor, there is motion blur due to gamma conversion.

Figure 1:
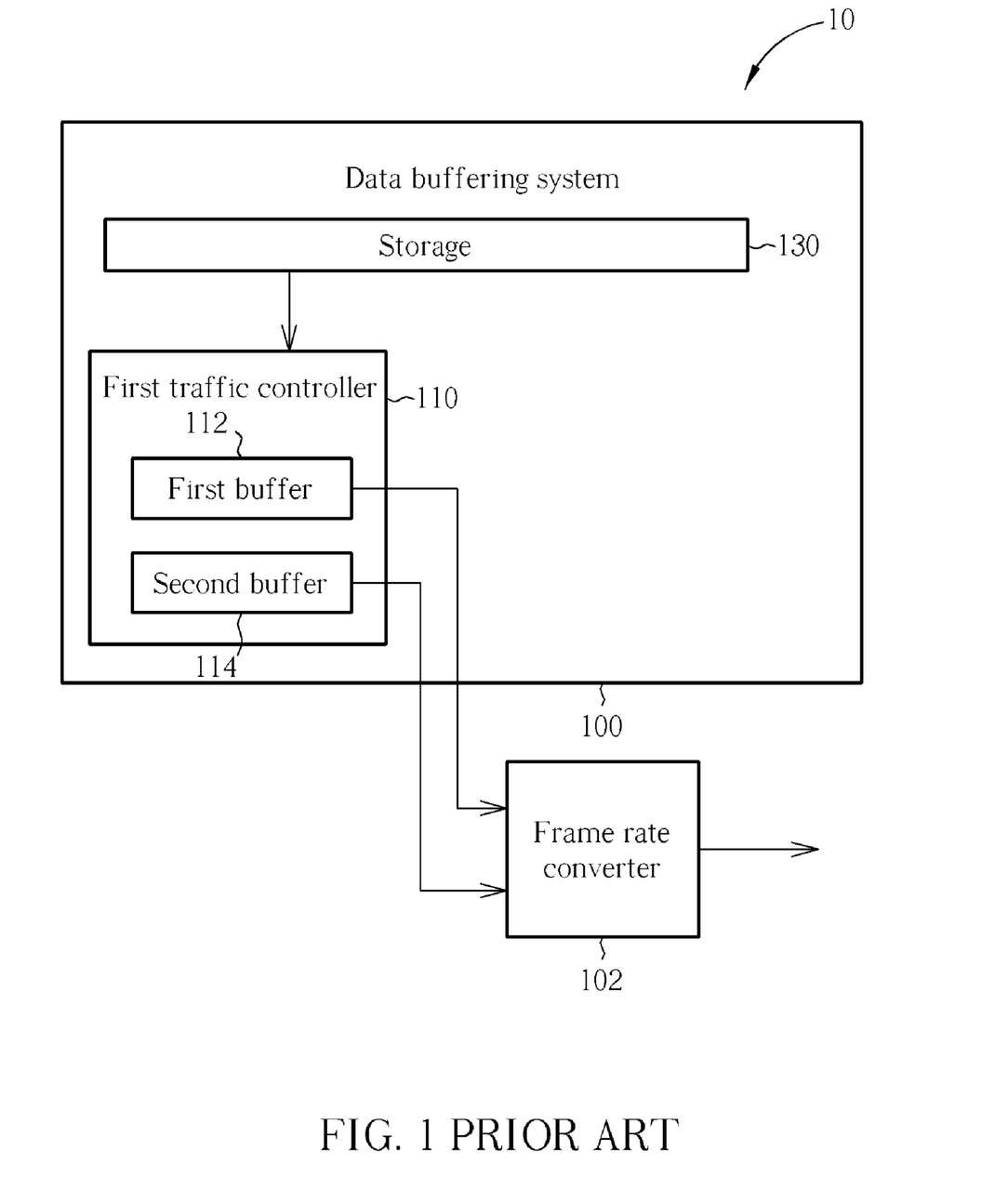
FIG. 1 is a block diagram of a prior art video stream processing apparatus.

Please refer to FIG. 1. FIG. 1 is a block diagram illustrating a prior art video stream processing apparatus 10 for video conversion. As shown in FIG. 1, the video stream processing apparatus 10 includes a data buffering system 100 and a frame rate converter 102. The data buffering system 100 receives a video stream with a plurality of frames and stores them into a storage 130. Then, a first traffic controller 110 accesses a first frame and a second frame from the storage 130 and buffers them in a first buffer 112 and a second buffer 114, respectively. When the video stream is displayed, a frame rate converter 102 accesses the first frame and the second frame from the first buffer 112 and the second buffer 114, respectively, and interpolates a first interpolated frame. Continuously, after the first interpolated frame is generated, the frame rate converter 102 outputs the first interpolated frame. As a result, the video conversion of the prior art architecture only interpolates one interpolated frame.

However, when the frame rate up-conversion is performed, more particularly in a film mode, the conventional frame rate converter only duplicates the generated frame according to the approach of generating frames with prior art video processors. The above-mentioned approach may increase the LCD's response time and reduce performance.

Therefore, a novel method of frame interpolation for frame rate up-conversion is required to both improve the motion blur and flicker issues and to shorten the LCD's response time.

SUMMARY OF THE INVENTION

It is therefore one of the objectives of the claimed invention to provide a method for video conversion of a video stream and apparatus thereof, to solve the above-mentioned problems and enhance image quality.

According to one embodiment of the claimed invention, a method for video conversion of a video stream comprises: interpolating a first interpolated frame according a first frame and a second frame of the video stream; and interpolating a second interpolated frame according to the first frame and the first interpolated frame According to yet another embodiment of the present invention, an apparatus for video conversion of a video stream is provided. The apparatus comprises: a data buffering system, for storing the video stream including a first frame and a second frame; and a frame rate converter, coupled to the data buffering system, for interpolating a first interpolated frame according to the first frame and the second frame and for interpolating a second interpolated frame according to the first frame and the first interpolated frame.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the following description and claims to refer to particular system components. As one skilled in the art will appreciate, manufacturers may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ." The terms "couple" and "couples" are intended to mean either an indirect or a direct electrical connection. Thus, if a first device couples to a second device, that connection may be through a direct electrical connection, or through an indirect electrical connection via other devices and connections.

Figure 2:
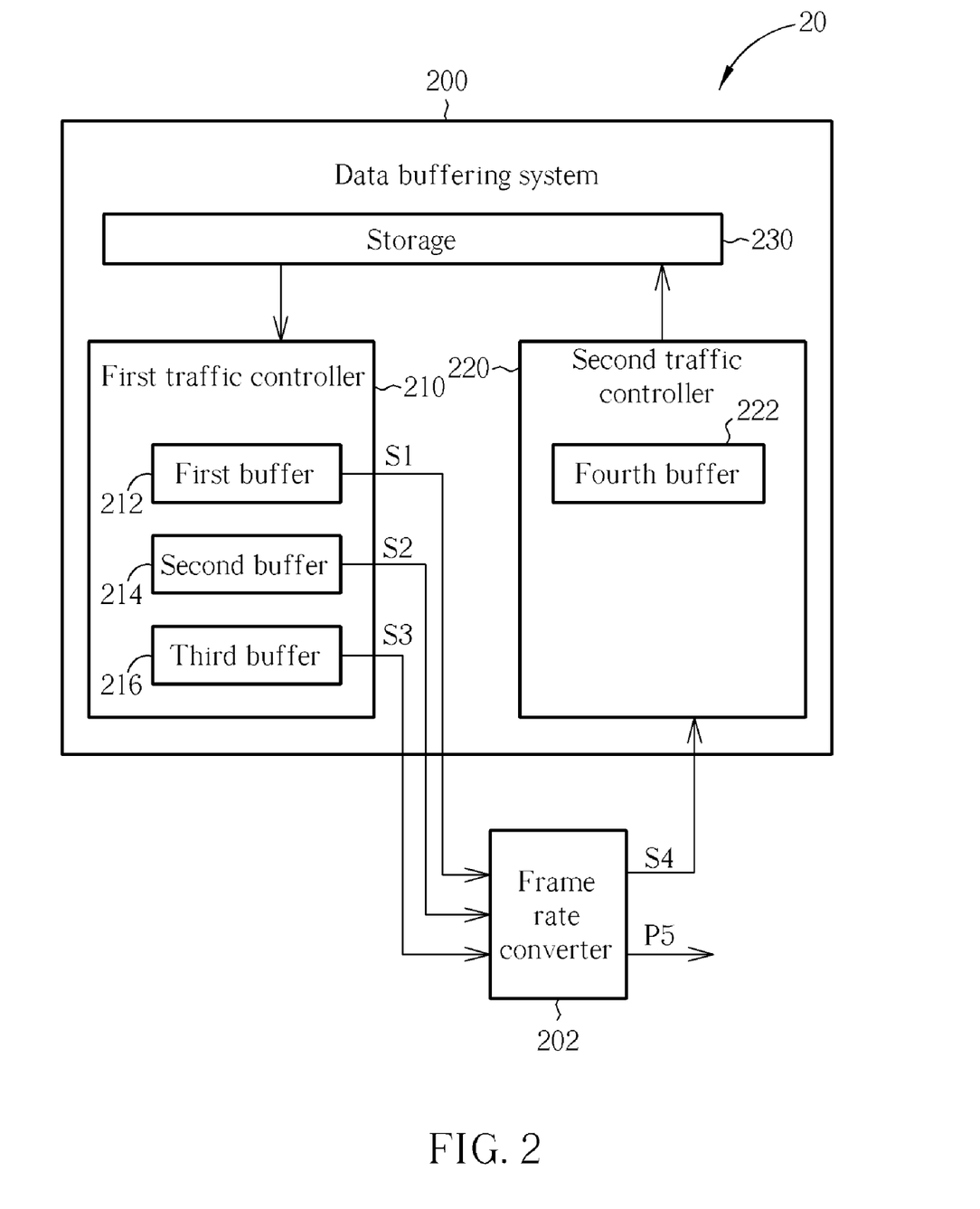
FIG. 2 is a block diagram illustrating an apparatus for video conversion of a video stream according to an embodiment of the present invention.

Please refer to FIG. 2. FIG. 2 is a diagram illustrating an apparatus 20 for video conversion of a video stream according to an embodiment of the present invention. The apparatus 20 comprises a data buffering system 200, for storing the video stream including at least a first frame and a second frame; and a frame rate converter 202, coupled to the data buffering system 200, for interpolating a first interpolated frame according to the first frame and the second frame and for interpolating a second interpolated frame according to the first frame and the first interpolated frame. In addition, the frame rate converter 202 further interpolates a third interpolated frame according to the second frame and the first interpolated frame. The data buffering system 200 comprises a storage 230, for storing the video stream; a first traffic controller 210, coupled to the storage 230 and the frame rate controller 202, for controlling data transfer between the storage 230 and the frame rate controller 202; and a second traffic controller 220, coupled to the storage 230 and the frame rate controller 202, for controlling data transfer between the storage 230 and the frame rate controller 202. In this embodiment, the first traffic controller 210 includes: a first buffer 212, storing the first frame; a second buffer 214, storing the second frame; and a third buffer 216; and the second traffic controller 220 includes a fourth buffer 222. Accordingly, after the first interpolated frame is generated, the frame rate controller 202 outputs the first frame and buffers the first interpolated frame into the fourth buffer 222 of the second traffic controller 220; and then the first interpolated frame buffered in the fourth buffer 222 is further buffered into the third buffer 216 of the first traffic controller 210; and after the first frame is outputted and the second interpolated frame is generated, the first traffic controller 210 overwrites the first frame buffered in the first buffer 212 by a third frame immediately following the second frame in the video stream. Furthermore, the frame rate converter 202 further sequentially outputs the second interpolated frame and the first interpolated frame after the first frame is outputted; and after the first interpolated frame is outputted, the first traffic controller 210 further overwrites the first interpolated frame buffered in the third buffer 216 by the third interpolated frame. And then, the frame rate converter 202 further interpolates a fourth interpolated frame according to the second frame buffered in the second buffer 214 and the third frame buffered in the first buffer 212, and then outputs the third interpolated frame buffered in the third buffer 216. After the third interpolated frame is outputted, the first traffic controller 210 further overwrites the third interpolated frame buffered in the third buffer 216 by the fourth interpolated frame. Please note that architectures and principles of the aforementioned circuit elements 200, 202, 210, 212, 214, 216, 220, 222 and 230 are well known in the art, and therefore not explained in detail herein for the sake of brevity.

Please note that in above exemplary embodiment, the second frame immediately follows the first frame in the video stream, and the third frame immediately follows the second frame in the video stream. Additionally, the aforementioned video stream is a 2:2 pull-down video stream. However, these are for illustrative purposes only and are not meant to be limitations of the present invention. That is, without departing from the spirit of the present invention, other alternative embodiments are available.

Figure 3:
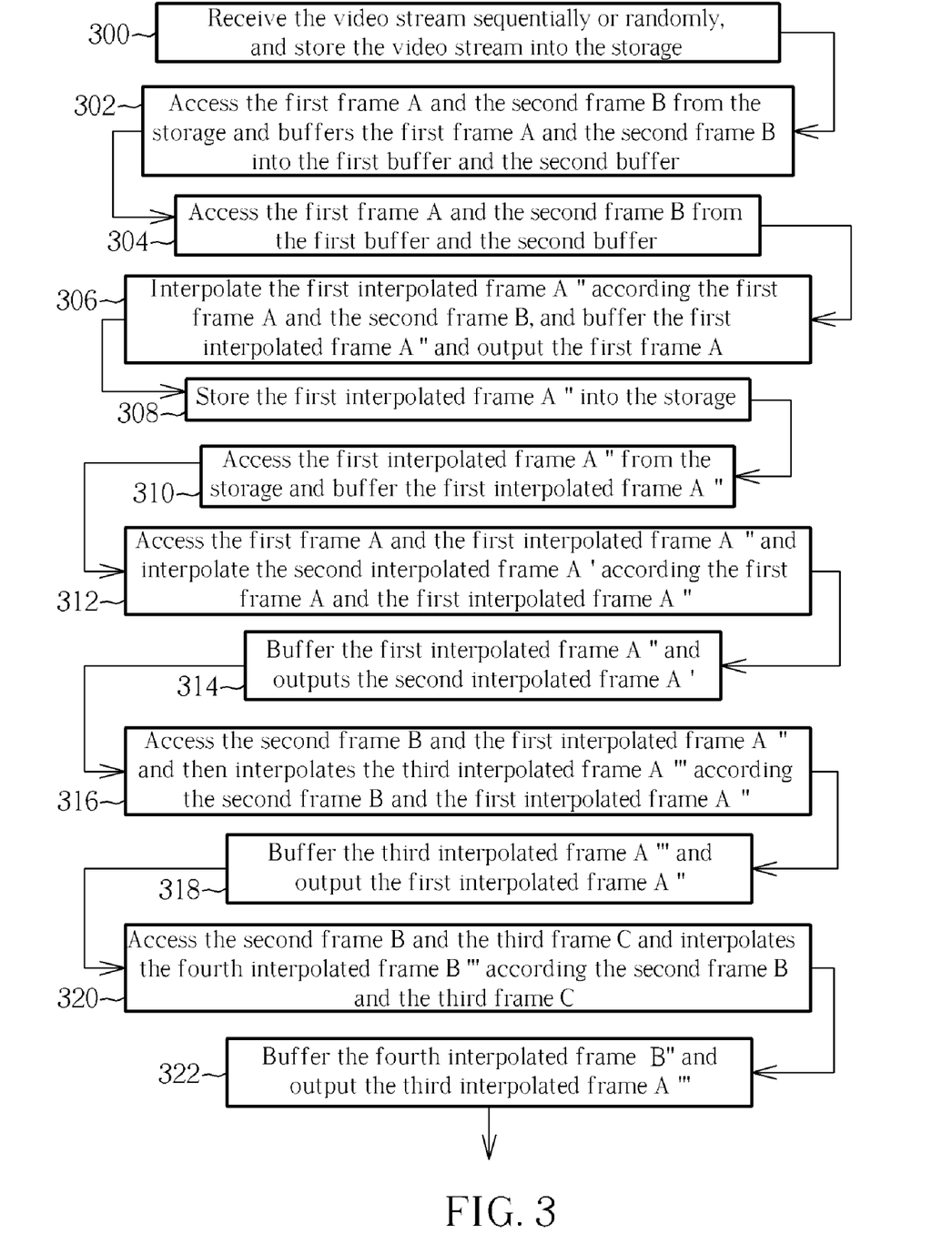
FIG. 3 is a flowchart illustrating a method for video conversion of a video stream according to one embodiment of the present invention.

Please refer to FIG. 2 in conjunction with FIG. 3. FIG. 3 is a flowchart illustrating a method for video conversion of a video stream according to one embodiment of the present invention. Provided that the result is substantially the same, the steps are not limited to be executed according to the exact order shown in FIG. 3. Referring to the flowchart, the operations for video conversion of the video stream are described as follows:

In Step 300, the data buffering system 200 receives the video stream sequentially or randomly, where the video stream comprises, without limitation, the first frame A, the second frame B and the third frame C, and stores the first frame A and the second frame B of the video stream into the storage 230. Then, in Step 302, when the first frame A and the second frame B of the video stream are displayed, the first traffic controller 210 accesses the first frame A and the second frame B of the video stream from the storage 203 and buffers the first frame A of the video stream and the second frame B of the video stream into the first buffer 212 and the second buffer 214, respectively, of the first traffic controller 210. In Step 304, the frame rate converter 202 accesses the first frame A of the video stream as the signal S1 and accesses the second frame B of the video stream as the signal S2 from the first buffer 212 and the second buffer 214, respectively, of the first traffic controller 210 in the data buffering system 200. Next, in Step 306, the frame rate converter 202 interpolates the first interpolated frame A" according to the first frame A (e.g. the signal S1 in FIG. 2) of the video stream and the second frame B (e.g. the signal S2 in FIG. 2) of the video stream, and buffers the first interpolated frame A" into the fourth buffer 222 of the second traffic controller 220, as indicated by the signal S4 in FIG. 2. The frame rate converter 202 synchronously outputs the first frame A, as indicated by the signal S5 in FIG. 2. It should be noted that the aforementioned frame buffering operation and frame outputting operation are not limited to be synchronous. In other embodiments of the present invention, without departing from the spirit of the present invention, performing the frame buffering operation and frame outputting operation asynchronously is also possible.

Figure 4:
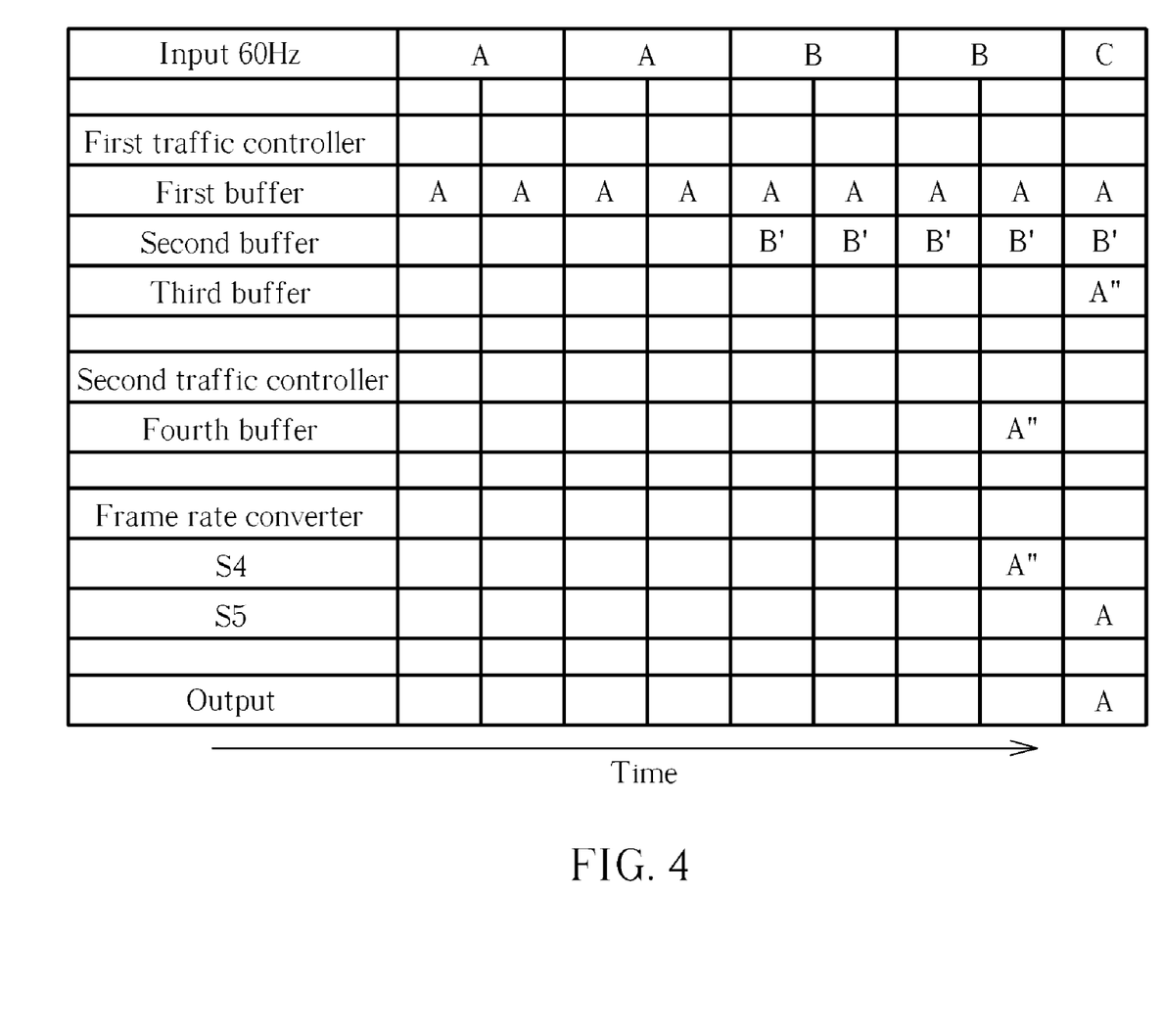
FIG. 4 is a diagram illustrating an exemplary video conversion of a video stream.

It should be noted that a skilled person can also readily appreciate the operations of the aforementioned operations of Step 300 to 306 in FIG. 3 after reading the above disclosure in conjunction with FIG. 2 and FIG. 4.

Continuing in Step 308, the second traffic controller 220 stores the first interpolated frame A" into the storage 230 when the first interpolated frame A" is needed for following frame interpolation operation. In Step 310, the first traffic controller 210 accesses the first interpolated frame A" from the storage 230 and buffers it into the third buffer 216. Next, in Step 312, the frame rate converter 202 accesses the first frame A buffered in the first buffer 212 as the signal S1, and the first interpolated frame A" buffered in the third buffer 214 as the signal S3 from the first traffic controller 210. The frame rate converter 202 then interpolates the second interpolated frame A' according to the first frame A (e.g., signal S1) and the first interpolated frame A" (e.g., signal S3). In Step 314, the frame rate converter 202 buffers the first interpolated frame A" as indicated by the signal S4 into the fourth buffer 222 of the second traffic controller 220, and synchronously outputs the second interpolated frame A' as indicated by the signal S5. It should be noted that the aforementioned frame buffering operation and frame outputting operation are not limited to be synchronous. In other embodiments of the present invention, without departing from the spirit of the present invention, performing the frame buffering operation and frame outputting operation asynchronously is also possible.

It should be noted that, at this time, the first traffic controller 210 accesses the third frame C from the storage 230 and buffers it into the first buffer 212. Accordingly, the third frame C overwrites the first frame A stored in the first buffer 212 because the first frame A is no longer needed in the following frame interpolation operation and has been outputted for display.

Figure 5:
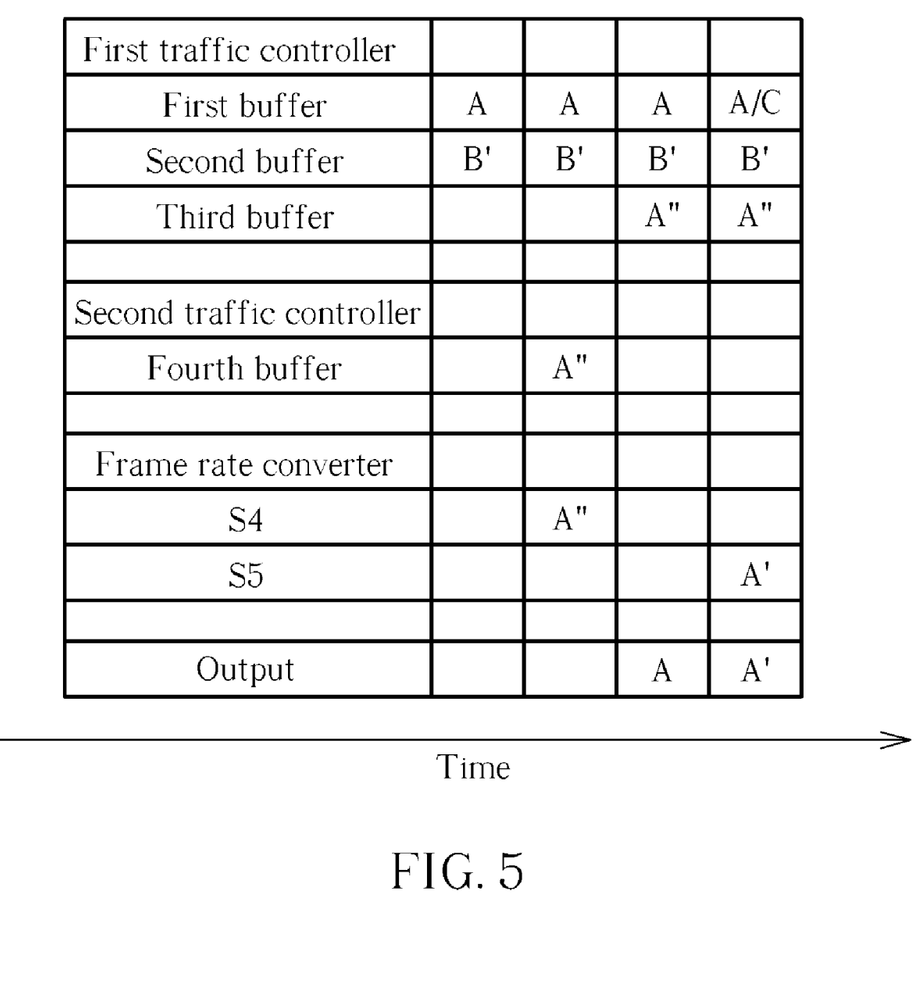
FIG. 5 is a continued diagram of the exemplary video conversion shown in FIG. 4.

A skilled person can readily appreciate the operations of the aforementioned operations of Step 308 to 314 in FIG. 3 after reading the above disclosure while referring to FIG. 2 and FIG. 5.

Continuing onto Step 316, the frame rate converter 202 accesses the second frame B as the signal S2 and the first interpolated frame A" as the signal S3 from the second buffer 214 and the third buffer 216 of the first traffic controller 210, respectively, and then interpolates the third interpolated frame A''' according to the second frame B (e.g., the signal S2) and the first interpolated frame A" (e.g., the signal S3). Next, in Step 318, the frame rate converter 202 buffers the third interpolated frame A''' as the signal S4 into the fourth buffer 222 of the second traffic controller 220 and synchronously outputs the first interpolated frame A" as the signal S5. It should be noted that the aforementioned frame buffering operation and frame outputting operation are not limited to be synchronous. In other embodiments of the present invention, without departing from the spirit of the present invention, performing the frame buffering and outputting operations asynchronously is also possible.

At this time, the second traffic controller 220 stores the third interpolated frame A''' into the storage 230, then the first traffic controller 210 accesses the third interpolated frame A''' from the storage 230 and buffers it into the third buffer 216. Accordingly, the third interpolated frame A''' overwrites the first interpolated frame A" in the third buffer 216 because the first interpolated frame A" is no longer needed in the following frame interpolation operation and has been outputted for display.

Figure 6:
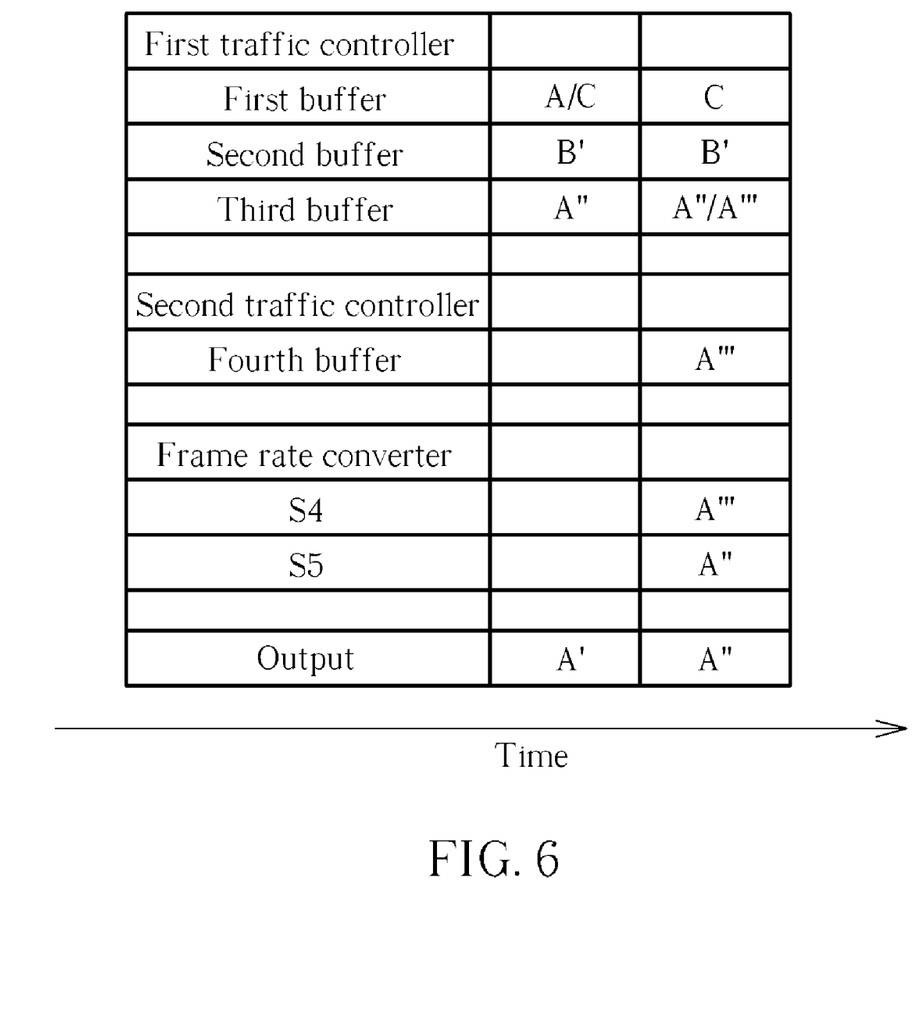
FIG. 6 is a continued diagram of the exemplary video conversion shown in FIG. 5.

A skilled person can readily appreciate the operations of the aforementioned operations of Step 316 to 320 in FIG. 3 after reading the above disclosure in conjunction with FIG. 2 and FIG. 6.

Further on in Step 320, the frame rate converter 202 accesses the second frame B as the signal S2 and the third frame C as the signal S1 from the second buffer 214 and the first buffer 212 of the first traffic controller 210, respectively, and then interpolates the fourth interpolated frame B''' according to the second frame B (e.g., the signal S2) and the third frame C (e.g., the signal S1). Next, in Step 322, the frame rate converter 202 buffers the fourth interpolated frame B'' as the signal S4 into the fourth buffer 222 of the second traffic controller 220 and synchronously outputs the third interpolated frame A''' as the signal S5. It should be noted that the aforementioned frame buffering operation and frame outputting operation are not limited to be synchronous. In other embodiments of the present invention, without departing from the spirit of the present invention, performing the buffering and outputting operations asynchronously is also possible.

Then the second traffic controller 220 stores the fourth interpolated frame B'' into the storage 230, then the first traffic controller 210 accesses the fourth interpolated frame B''' from the storage 230 and buffers it into the third buffer 216. Accordingly, the fourth interpolated frame B'' overwrites the third interpolated frame (A''') stored in the third buffer 216 because the third interpolated frame A''' is no longer needed in the following frame interpolation operation and has been outputted for display.

Figure 7:
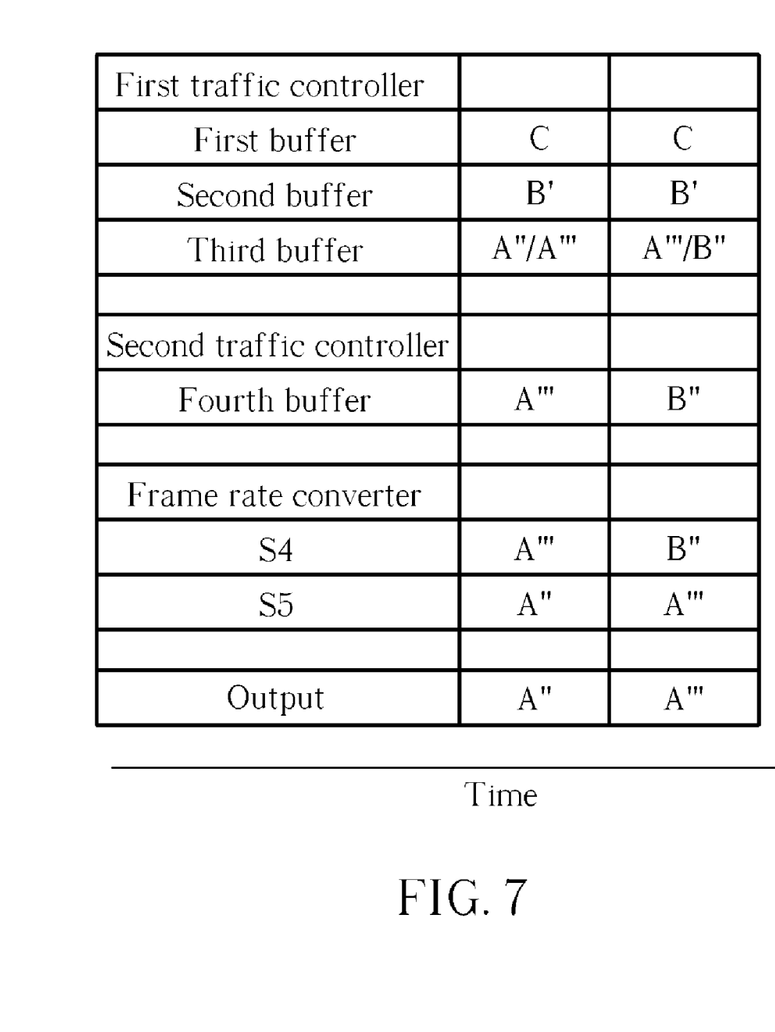
FIG. 7 is a continued diagram of the exemplary video conversion shown in FIG. 6.

A skilled person can readily appreciate the operations of the aforementioned operations of Step 320 to 322 in FIG. 3 after reading the above disclosure in conjunction with FIG. 2 and FIG. 7.

Figure 8:
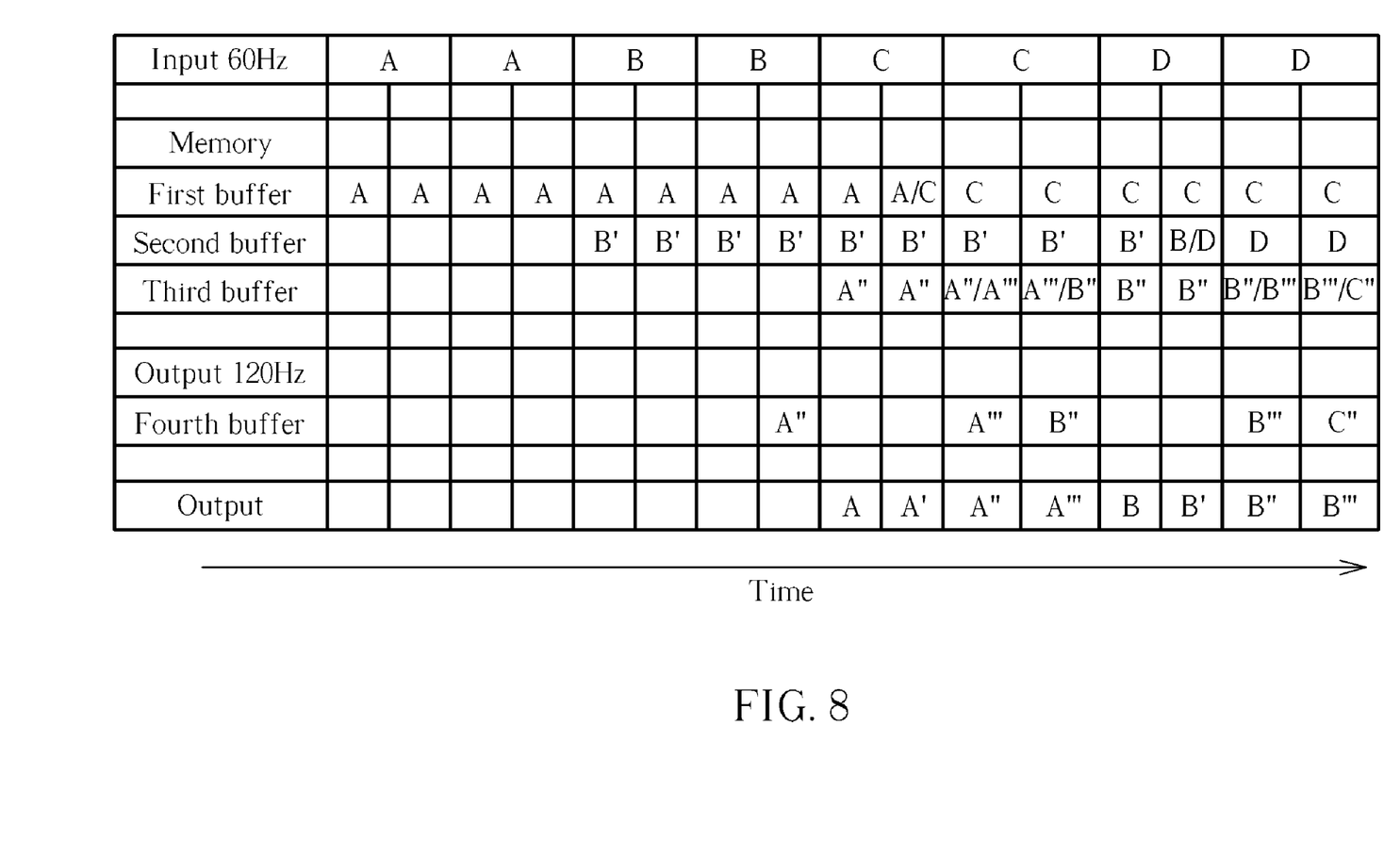
FIG. 8 is a sequence diagram illustrating video conversion of the video stream.

Please refer to FIG. 8. FIG. 8 is a sequence diagram illustrating video conversion of the video stream. Referring to the above disclosure, an ordinary person skilled in the art can readily appreciate operations of the frame interpolation of the video stream as illustrated in FIG. 8. Further description of the frame interpolations is omitted here for the sake of brevity.

The illustrations of the aforementioned embodiments perform three counts of interpolation between two frames to obtain three interpolated frames for advancing the sharpness of the video, and more particularly, the sharpness of edges of the video. In the aforementioned embodiments, the order of the interpolation is as follows: first, the frame A" is interpolated according to the first frame A and the second frame B, i.e. the frame A" corresponds to the aforementioned first interpolated frame; then, the frame A' is interpolated according to the first frame A and the frame A", i.e. frame A' corresponds to the aforementioned second interpolated frame; lastly, the frame A''' is interpolated according to the frame A" and the second frame B, i.e. the frame A''' corresponds to the aforementioned third interpolated frame. Additionally, in the present invention, the frame A" is first interpolated according to the first frame A and the second frame B, i.e. the frame A" is corresponding to the aforementioned first interpolated frame; then, frame A''' is interpolated according to the first frame A and the frame A", i.e. the frame A''' corresponds to the aforementioned second interpolated frame; finally, the frame A' is interpolated according to the frame A" and the second frame B, i.e. frame A' corresponds to the aforementioned third interpolated frame. Please note that the aforementioned interpolated order is for illustrative purposes only and is not meant to be a limitation of the present invention.

According to another alternative design of the present invention, the video conversion performs two counts of interpolation between the two original frames. As a result, the alternative design of the present invention also enhances the sharpness of the video over the prior art, and is more efficient than the prior art.

In conclusion, the video stream of a film mode displayed in current media display system is smoother and clearer due to the disclosed frame interpolation scheme. In addition, the data buffering system of the present invention has an additional traffic controller having a cheap buffer included therein, and is implemented without substantially altering the conventional hardware architecture. In other words, the hardware implementation is not complicated, and the production cost remains low.

Those skilled in the art will readily observe that numerous modifications and alterations of the device and method may be made while retaining the teachings of the invention.

What is claimed is:

1. A method for video conversion of a video stream, the method being applied to an apparatus for video conversion of the video stream, the method comprising:
   interpolating according to a frame $F_A$ and a frame $F_B$ of the video stream to generate a frame $F_{A''}$, wherein the frame $F_B$ follows the frame $F_A$ in the video stream;
   interpolating according to the frame $F_A$ and the frame $F_{A''}$ generate a frame $F_{A'}$;
   interpolating according to the frame $F_B$ and the frame $F_{A''}$ to generate a frame $F_{A'''}$;
   buffering the frame $F_A$ and the frame $F_B$;
   after the frame $F_{A''}$ is generated, outputting the frame $F_A$ and buffering the frame $F_{A''}$; and
   after the frame $F_A$ is outputted and the frame $F_{A'}$ is generated, overwriting the frame $F_A$ by a frame $F_C$ following the frame $F_B$ in the video stream.

2. The method of claim 1, further comprising:
   sequentially outputting the frame $F_{A'}$ and the frame $F_{A''}$ after the first frame $F_A$ is outputted; and
   after the frame $F_{A''}$ is outputted, overwriting the frame $F_{A''}$ by the frame $F_{A'''}$.

3. The method of claim 2, further comprising:
   interpolating according to the frame $F_B$ and the frame $F_C$ to generate a frame $F_{B'''}$;
   outputting the frame $F_{A'''}$; and
   after the frame $F_{A'''}$ is outputted, overwriting the frame $F_{A'''}$ by the frame $F_{B'''}$.

4. The method of claim 1, wherein the video stream is a 2:2 pull-down video stream.

5. An apparatus for video conversion of a video stream, comprising:
   a data buffering system, for storing the video stream including a frame $F_A$ and a frame $F_B$; and
   a frame rate converter, coupled to the data buffering system,
      for interpolating according to the frame $F_A$ and the frame $F_B$ to generate a frame $F_{A''}$ and for interpolating according to the frame $F_A$ and the frame $F_{A''}$ to generate a frame $F_{A'}$, and for interpolating according to the frame $F_B$ and the frame $F_{A''}$ to generate a frame $F_{A'''}$, wherein the frame $F_B$ follows the frame $F_A$ in the video stream;
   wherein the data buffering system comprises:
   a storage, for storing the video stream;

a first traffic controller, coupled to the storage and the frame rate controller, for controlling data transfer between the storage and the frame rate controller, the first traffic controller comprising:
 a first buffer, storing the frame $F_A$;
 a second buffer, storing the frame $F_B$; and
 a third buffer; and
a second traffic controller, coupled to the storage and the frame rate controller, for controlling data transfer between the storage and the frame rate controller, the second traffic controller comprising a fourth buffer;
wherein after the frame $F_{A''}$ is generated, the frame rate controller outputs the frame $F_A$ and stores the frame $F_{A''}$ into the fourth buffer of the second traffic controller; and then the frame $F_{A''}$ buffered in the fourth buffer is further buffered into the third buffer of the first traffic controller; and after the frame $F_A$ is outputted and the frame $F_{A'}$ is generated, the first traffic controller overwrites the first frame $F_A$ buffered in the first buffer by a frame $F_c$ following the frame $F_B$ in the video stream.

6. The apparatus of claim 5, wherein the frame rate converter further sequentially outputs the frame $F_{A'}$ and the frame $F_{A''}$ after the frame $F_A$ is outputted; and after the frame $F_{A''}$ is outputted, the first traffic controller further overwrites the frame $F_{A''}$ buffered in the third buffer by the frame $F_{A'''}$.

7. The apparatus of claim 6, wherein the frame rate converter further interpolates according to the frame $F_B$ buffered in the second buffer and the frame $F_C$ buffered in the first buffer to generate a frame $F_{B'''}$; the frame rate converter outputs the frame $F_{A'''}$ buffered in the third buffer; and after the frame $F_{A'''}$ is outputted, the first traffic controller further overwrites the frame $F_{A'''}$ buffered in the third buffer by the frame $F_{B'''}$.

8. The apparatus of claim 5, wherein the video stream is a 2:2 pull-down video stream.

* * * * *